No. 784,970. PATENTED MAR. 14, 1905.
M. L. WILLIAMS.
DRINKING UTENSIL.
APPLICATION FILED JUNE 25, 1904.

Witnesses.

Inventor.
Maud L. Williams,
By James L. Norris
Atty.

No. 784,970.

Patented March 14, 1905.

UNITED STATES PATENT OFFICE.

MAUD L. WILLIAMS, OF ST. LOUIS, MISSOURI.

DRINKING UTENSIL.

SPECIFICATION forming part of Letters Patent No. 784,970, dated March 14, 1905.

Application filed June 25, 1904. Serial No. 214,191.

*To all whom it may concern:*

Be it known that I, MAUD L. WILLIAMS, a citizen of the United States, residing at St. Louis, in the State of Missouri, have invented new and useful Improvements in Drinking Utensils, of which the following is a specification.

The invention relates to drinking utensils, and has for its object to provide an improved cup for use in drinking tea, coffee, chocolate, and the like, which cup shall be provided with an integral surrounding jacket forming a chamber for receiving hot water, whereby the contents may be prevented from cooling before they have been entirely drunk.

In order that the advantages pertaining to the invention may be more clearly understood and the objections which it aims to overcome appreciated, it may be stated that frequently cups are made of such thin material, especially in the finer grades of china, that the coffee readily cools, so that often a considerable portion of the coffee is left in the cup by reason of the fact that it has become relatively cold and insipid. Furthermore, since the almost universal adoption of electric fans in places of public refreshment it is well known that coffee and other beverages which are designed to be drunk while very warm or hot are cooled by the air propelled by said fans before any considerable quantity thereof can be consumed.

Having thus stated the general purposes of the invention and the inconveniences which it is designed to overcome, I will now proceed to describe the same in detail, referring to the accompanying drawings, in which—

Figure 1:
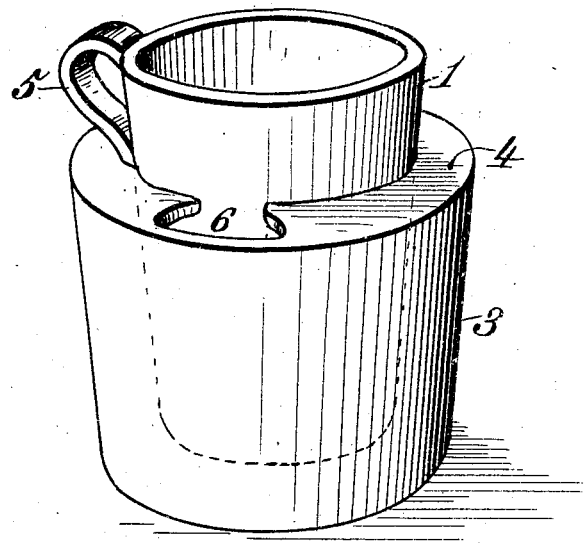
Figure 2:
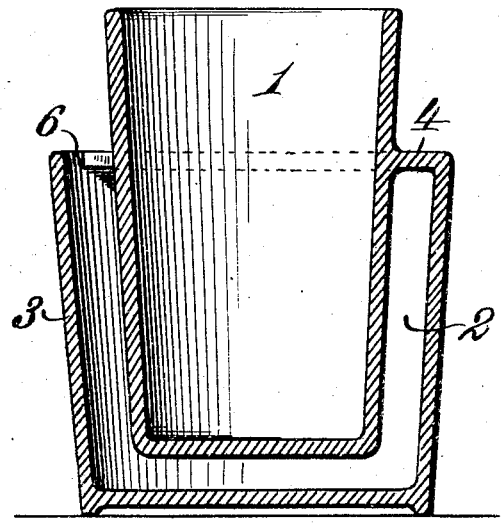

Figure 1 is a perspective view of the invention, and Fig. 2 is a central vertical sectional view of the same.

1 indicates the cup proper, which may be of china, porcelain, or any other material and of any desired shape. Surrounding the cup at a distance therefrom to provide a chamber 2 is a wall 3, which is formed integral with the cup 1, the point of attachment being at the top of the wall 3, where a bridge 4 is formed spanning the space between the wall and the side of the cup 1. Said cup 1 projects a suitable distance above the jacket 3 and on said projecting portion is provided with a handle 5. This is the preferred construction. The handle 5, however, may be applied, if found desirable, to the side of the water-jacket 3. The bottom of the cup 1 does not extend to the bottom of the water-jacket 3, as shown by Fig. 2, the chamber 2 therefore extending around and underneath of said cup. In the bridge 4, preferably on the side of the utensil opposite to that at which the contents of the cup would ordinarily be drunk, I provide an opening 6, through which hot or boiling water may be poured into the chamber 2 surrounding the cup. As the hot water supplied to the chamber 2 is not exposed to the atmosphere except through the small opening 6, it follows that said water will not cool off as quickly as will the coffee in the cup 1, and hence this water will serve the purpose of maintaining the coffee or other contents of the cup 1 at the desired temperature.

It will be readily apparent to those skilled in the art that the utensil as a whole may be made to have an artistic appearance and by the proper relative arrangement of the two parts of the utensil in a manner to conserve to the utmost the additional space occupied by the jacket 3 that the device need not be very much larger in size than the ordinary drinking-cup.

Having thus fully described my invention, what I claim is—

A drinking utensil for heated beverages, comprising a cup formed with a handle, and a casing surrounding said cup at a distance from its sides and bottom and integrally connected at its upper end to the cup, the cup projecting uniformly on all sides above the casing, the projecting portion thereof carrying said handle, said casing having an opening in its upper end located on one side of an imaginary line passing through the handle and the center of the cup.

In testimony whereof I have hereunto set my hand in presence of two subscribing witnesses.

MAUD L. WILLIAMS.

Witnesses:
E. W. GROVE,
F. N. HAMMETT.